United States Patent [19]

Hagan et al.

[11] Patent Number: 4,571,498
[45] Date of Patent: Feb. 18, 1986

[54] APPARATUS FOR INTERROGATING PHOTOTRANSISTORS AND THE LIKE

[75] Inventors: James C. Hagan; Owen C. Hagan, both of Stockton, Calif.

[73] Assignee: Hagan Engineering, Inc., Stockton, Calif.

[21] Appl. No.: 664,316

[22] Filed: Oct. 24, 1984

Related U.S. Application Data

[62] Division of Ser. No. 395,804, Jul. 6, 1982, Pat. No. 4,490,801.

[51] Int. Cl.⁴ ............................................. G01N 21/86
[52] U.S. Cl. ..................................... 250/560; 250/221
[58] Field of Search ...................... 250/560, 221, 222.1, 250/578, 211 R, 208, 209; 356/380–387; 357/30, 31, 32; 358/212, 213

[56] References Cited

U.S. PATENT DOCUMENTS

3,764,813 10/1973 Clement et al. ...................... 250/221
4,160,599  7/1979 Sperrazza ............................ 250/560
4,267,443  5/1981 Carroll et al. ...................... 250/560

Primary Examiner—David C. Nelms
Attorney, Agent, or Firm—Thomas H. Olson

[57] ABSTRACT

An article sensor which defines an opening through which articles to be measured are propelled in a non-supported condition. Bounding the opening are at least two mutually perpendicular arrays of light sources and of photodetectors. The photodetectors constitute the inputs to a microprocessor controlled circuit so that the number and identity of photodetectors that are obscured by a passing article can be determined rapidly thereby enabling plural measurements of articles dimensions to be made during traversal of a single article. The microprocessor can be programmed to compute the volume of an article, the weight of an article or virtually any other characteristic of an article. A circuit for controlling and interrogating the photodetectors which permits interrogation of the photodetectors at a rate corresponding to that at which the microprocessor operates. The circuit in a first phase of operation senses the voltage drop across the phototransistor without significantly discharging current carriers from the base of the transistor and in a second phase totally discharges the base in preparation for a succeeding measurement so that determination of the condition of the photodetectors is achieved rapidly and accurately.

5 Claims, 14 Drawing Figures

APPARATUS FOR INTERROGATING PHOTOTRANSISTORS AND THE LIKE

This application is a division of application Ser. No. 395,804; filed July 6, 1982 and now U.S. Pat. No. 4,490,801.

BACKGROUND OF THE INVENTION

1. Field of the Invention

This invention relates to article sizing apparatus for measuring the volume, weight or shape of articles such as fresh vegetables and the like, and to a system for loading containers with the articles to a precise preselected weight.

2. Description of the Prior Art

The present invention employs a plurality of light sources which produce light beams that are directed to photodetectors, the light sources and photodetectors are arranged so that one or more of the light beams is interrupted by an article moving between a source and the associated photodetector. This general technique is disclosed in the known prior art.

U.S. Pat. No. 2,782,833 to Biggs discloses equipment for measuring the length and/or width of a flat object. The disclosed apparatus has a light source and a photodiode array between which the object to be measured is interposed. Circuitry for sensing the photodiodes to which light has been interrupted is provided as is a counter that produces an output representative of length, width or area of the flat object.

U.S. Pat. No. 4,120,403 to Stephanos discloses a light source and a photocell array between which articles such as fruit pieces are moved on a conveyor. Light energy to the photocells up to the height of the article is interrupted, and there is circuitry for determining how many of the photocells are illuminated and how many are dark. Downstream of the photocell array is a solenoid driven mechanism which diverts from the conveyor articles that conform to some prescribed criterion.

U.S. Pat. No. 4,144,449 to Funk discloses a position detection apparatus that employs change-coupled devices which are illuminated by continuous light sources, such as fluorescent lamps. The position of an opaque object introduced between the lamp and the charge-coupled devices is ascertained by sensing signal changes in the charge-coupled devices.

U.S. Pat. No. 4,173,788 to Laliotis discloses a device for measuring the length and cross-sectional dimension of a log. There is an array of photosensitive elements and a lens which focuses light reflected from the log onto the elements. Through computer control, the number and position of excited photosensitive elements produces information indicative of the cross-sectional shape of the log and the longitudinal shape of the log.

U.S. Pat. No. 4,267,443 to Carroll discloses a photoelectric input apparatus for detecting the position and speed of movement of a finger, stylus or like elongate object. The apparatus includes a structure that defines a square hole. Orthogonal arrays of cooperating photocells and photodetectors are disposed on the walls that define the hole. An object introduced into the hole interrupts light beams to at least two of the photocells, and there is a logic circuit which produces an output representative of the position of the object within the hole.

SUMMARY OF THE INVENTION

In the embodiment of the invention that is described in more detail hereinafter there is a housing in which is formed a square opening through which food articles, such as potatoes, are transported in single file. The walls that define the opening have a row of slits arranged so that the slits in confronting pairs of walls are aligned with one another. Within the housing and in alignment with each slit at one side of the opening is a light source, such as a light emitting diode (LED). Within the housing in alignment with the slit in the opposite wall is a photosensing element, such as a phototransistor. When an article passes between the LED and the phototransistor, the electrical condition of the phototransistor experiences a perceptible change and there is a microprocessor controlled circuit for evaluating the change and employing it to compute the volume and/or the weight of the article. The slits on the inner ends of which the LEDs and phototransistors are mounted are narrow and deep so that a given phototransducer is influenced only by light from a single LED associated therewith and not from the other LEDs or from ambient light. Thus a system incorporating the invention can be operated in virtually any environment without concern for the ambient lighting condition in the environment.

The housing that defines the opening through which articles are transported is substantially airtight and the slits constitute the only path of escape from the housing. At a location remote from the opening there is a fan or pump which introduces filtered air into the housing and as the air egresses from the slits it prevents entry or accumulation of dust or dirt which would impair the accuracy and consistency of the phototransistor responses to passing articles. Within the housing are the circuit elements employed in deriving from the phototransistor signals information concerning the size or weight of the object and these electronic components are mounted within the path between the air inlet and the slits so that overheating of the electrical elements is avoided.

The article sensor referred to above is incorporated into a container filling machine which can fill containers to a very precise weight. Many fresh fruits and vegetables are sold at retail in sealed packages which must bear an accurate indication of the weight of the contents. If the containers are underfilled, the seller of the products could well be accused of misleading customers, and if the containers are overfilled, adverse economic consequences can befall the packer and seller of the products.

An object of the invention is to provide a sensor for detecting the size of an article with substantial accuracy and at a sufficiently high rate that the combination of high throughput rates and accurate results can be obtained. This object is achieved in accordance with the present invention because the photocells are isolated from ambient light so that each is influenced by only one LED. Moreover, the photosensors are interrogated by a microprocessor controlled circuit that is capable of performing measurements at a high rate, e.g. a rate of three hundred and thirty, or more, measurements per second.

Another object of the invention is to provide a sensor which maintains its accuracy even after long periods of hard usage. This object is achieved in part by the previously noted air flow path which maintains the light conducting slits in a clean condition and which maintains the temperature of all electrical components at a substantially constant level.

A further object is to provide a circuit that can virtually instantaneously measure and compute the weight of an article passing the sensor. Achievement of this object makes possible the rapid and accurate filling of containers of articles to highly accurate weight tolerances.

Achievement of the immediately preceeding object makes possible construction of an uncomplex container filling machine because the weight of an article is known virtually immediately after its exit from the sensor. Thus the article can be directed to a selected container that requires or can accept an article of the detected weight or size.

The foregoing, together with other objects, features, and advantages of the invention will be more apparent after referring to the following specification and the accompanying drawings.

DESCRIPTION OF THE PREFERRED EMBODIMENT

Referring more particularly to the drawings, reference numeral 12 generally indicates an article sensor embodying the invention. Sensor 12 is in the form of a housing having an upstream front plate 14, a downstream lower rear plate 16 and a downstream upper rear plate 18. The plates are formed of rigid opaque high strength material such as aluminum. Extending between the plates at their peripheral margins is a lower wall 20 and right and left side walls 22 and 24. The side walls are stepped and there is a wall 26 which extends between lower rear panel 16 and upper rear panel 18 to form a closed chamber within housing 12. A top wall 27 spans the upper extremities of side walls 22 and 24 between front plate 14 and rear plate 18 so that there is a sealed chamber formed by the housing. Rubber gaskets indicated at 28 are provided to assure that the chamber interior of the housing is both light-tight and air-tight. Front plate 14 is provided with one or more air inlet ports 29 to which filtered, pressurized air is supplied. Front plate 14 is formed with a square opening 30 and rear plate 16 is formed with a square opening 32. The openings are congruent to and in alignment or registry with one another.

Figure 3:
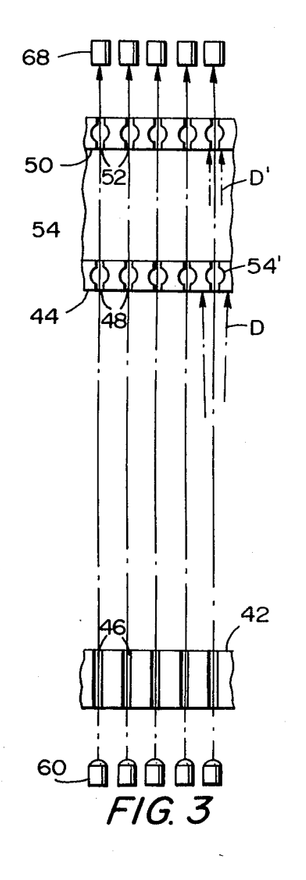
FIG. 3 is a fragmentary view at enlarged scale taken from the same direction as FIG. 1 and showing in fuller detail the co-location of LEDs and phototransistors employed in practicing the invention.

Surrounding openings 30 and 32 in the space between plates 14 and 16 is a light guide member 34. As seen in the drawings, light guide member 34 is formed of a unitary piece of material such as aluminum having a thickness less than that of bottom wall 20 so that light guide members fits between plates 14 and 16. There is a spacer 35 with cooperates with gasket 28 to maintain the airtight conditions interior of housing 12. The unitary construction of light guide member is not critical because it can be made of a plurality of individual parts. Light guide member 34 defines a contral opening 36 which is congruent to and in registry with plate openings 30 and 32 to form a passage through which an article can be transported. The light guide member, as viewed in FIG. 1, has a right side wall 38, a left side wall 40, a bottom wall 42, and a top wall 44. Bottom wall 42 is substantially identical to side wall 38 so the detailed showing of bottom wall 42 in FIG. 3 is exemplary of side wall 38. Similarly, because top wall 44 and side wall 40 are substantially identical, the detailed showing of the former in FIG. 3 is exemplary of the latter.

Referring to FIG. 3, bottom wall 42 is provided with a row of slits 46 which are perpendicular to the surface of central opening 36 of the light guide member. The slits are spaced from one another at suitable intervals, the slits being twenty-four in number and spaced on one quarter inch centers in one apparatus designed in accordance with the present invention. Top wall 44 which confronts bottom wall 42 across opening 36 defines slits 48 which are disposed on centers equivalent to that of slits 46 and are in alignment with slits 46. Interior of wall 44 is an inner wall 50 which defines slits 52 that are spaced on centers equivalent to slits 48 and are in alignment with slits 48. Between top wall 44 and inner wall 50 there is an excised portion which defines a cavity 54, cavity 54 serving to space inner wall 50 from top wall 44 and to avoid spreading of light paths as will be described hereinafter. Intermediate the extremities of slits 48 and 52 are bored cylindric chambers 54' which contribute to collimation of light from the LEDs by disrupting reflections from the walls of the slits.

Interior of bottom wall 42 is an LED support bracket 55 in the form of a right angle member having a baseleg 56 fastened to plate 14 and an upstanding leg 58 for supporting LEDs 60. Upstanding leg 58 has a plurality of holes on the same centers as slits 46, 48, and 52, and an LED is adhesively or otherwise secured in each of the respective holes. The holes are the same in number as are the slits. A similar LED support bracket 62 is provided for cooperation with side wall 38. A phototransistor support bracket 63 has a base leg 64 secured to panel 14 and an upstanding leg 66 in which is formed a row of holes in which photodiodes 68 are cemented or otherwise suitably secured. The holes in upstanding plate 66 are spaced at intervals corresponding to that of slits 52 and of LEDs 60 and are in alignment with respective slits. A substantially identical photodiode support 70 is provided for cooperation with left side wall 40.

Figure 1:
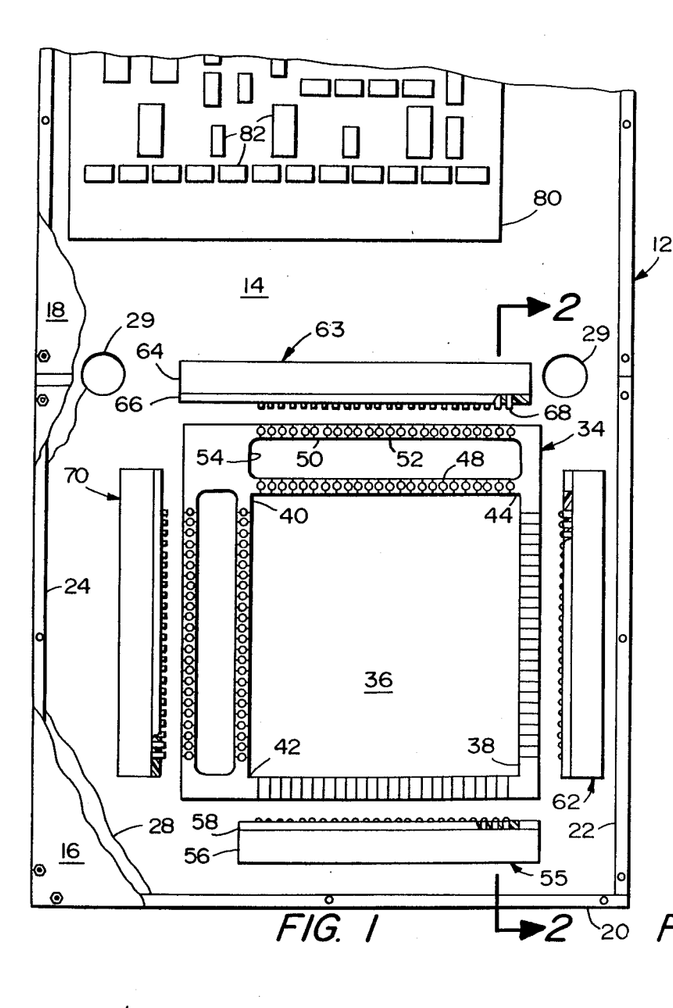
FIG. 1 is an elevation view of a sensor embodying the invention, portions being broken away to reveal internal details.

As can be seen in FIG. 1, the support brackets for the LEDs and the photodiodes are installed such that the LEDs and photodiodes are spaced apart from the inner ends of the respective slits with which they are associated. This space permits substantially unrestricted air flow through the slits so as to avoid buildup of dirt in the slits or on the phototransistors. The space also better isolates the phototransistors from ambient light so that excitation of the phototransistors is substantially confined to that from a single LED on the opposite of the article transport path.

As is probably apparent from the description to this point, an article traversing opening 36 interrupts a portion of the light beams impinging on the phototransistors, the number of light beams interrupted, or the number of phototransistors maintained in a relatively dark condition, depending on the size and shape of the article traversing the path. An important aspect of the invention is the circuitry which permits such rapid sensing of all phototransistors that plural readings of the number and location of the phototransistors obscured by the article can be taken during passage of the article through the opening.

The elements constituting such circuitry are mounted on a circuit board 80 which is disposed in the chamber within housing 12. Although the individual elements that make up the circuit are conventional, such elements being indicated diagrammatically at 82, their organization and interconnection contributes materially to the salutary advantages of the present invention.

Figure 8:
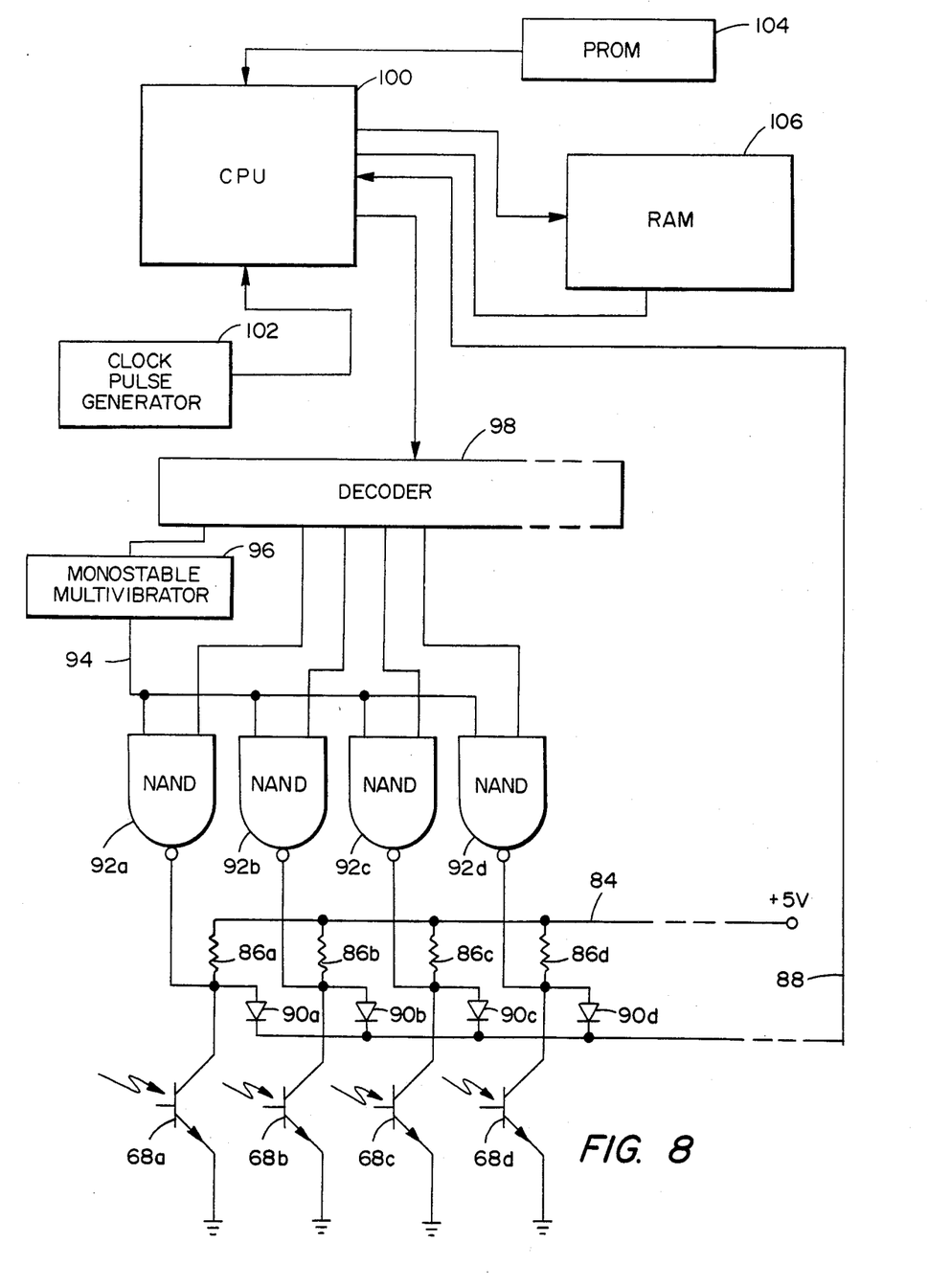
FIG. 8 is a schematic/block diagram of exemplary circuitry employed in practicing the invention.

Referring to FIG. 8, four phototransistors 68 are shown at the bottom of the drawing and are identified by reference characters 68a, 68b, 68c, and 68d. No connections are made to the bases of the respective phototranistors. There is a collector voltage supply of five volts supplied via a power line 84. The power is supplied to the collectors of the respective phototransistors through load resistors 86a, 86b, 86c and 86d. The emitters of the phototransistors are grounded. When the phototransistors 68 are dark, their resistance to current flow is very high so that the collector of each transistor is at a high voltage, i.e. a voltage essentially equal to five volts. In contrast, when photons impinge on the base of the phototransistors, the photons form current carriers which reduce the base resistance and therefore permit current flow through the transistor. Such current flow lowers the voltage on the collectors. Each collector constitutes the output of the transistor with which it is associated; these collectors are connected to an output signal lead 88 through respective isolation diodes 90a, 90b, 90c and 90d. Also coupled to the respective collectors of phototransistors 68 are the outputs of the NAND gates 92a, 92b, 92c and 92d, respectively. The outputs of the NAND gates are normally at a logical low level, a level at or near zero volts. For the purposes of the present description, the normal output of the NAND gates is the level thereof when all inputs to the NAND gates are high.

Each NAND gate 92 has two inputs. One input of each NAND gate is connected via a common lead 94 to the output of a monostable multivibrator 96, the output of which is normally high. The other input to each NAND gate is individually connected via a decoder 98 to a CPU 100 so that a short negative going pulse is applied to each of the NAND gates in sequence.

The sequence of signals applied to the NAND gates by decoder 98 is controlled by a central processing unit (CPU) 100. CPU is preferably a microprocessor mounted on circuit board 80 in the interior of housing 12. System timing is established by a clock pulse generator 102 which is typically a crystal controlled oscillator. For programming system operation, there is a programmable read only memory (PROM) 104 which has sufficient capacity to program CPU 100 to enable the CPU to perform all necessary functions. As will be explained more fully hereinbelow, the program provided by PROM 104 is typically different for different articles and different characteristics of the articles that are to be measured. Finally, there is random access memory (RAM) 106 which provides temporary memory for CPU 100 and affords storage of the various states obtained when photodiodes 68 are interrogated. The interaction of the various elements seen in FIG. 8 will become more apparent from the succeeding description of the circuit operation.

Before describing operation of the circuit, an important characteristic of phototransistors 68 that is exploited by the present invention will be explained. The following explanation is based on an NPN planar silicon phototransistor designated type TIL81 and manufactured and sold by Texas Instruments, Inc. It will be appreciated that such specific unit is exemplary and not limiting. Phototransistors operate by receiving photons on the base of the transistor; the photons create current carriers in the base so that when appropriate voltages are applied across the collector/emitter, the current flow through the collector/emitter circuit is a function of the number of photons that have impinged on the base. Stated otherwise, the amount of current flow depends on the total number of photons that have impinged on the base over time. In the present invention, where low levels of light are employed, the photons are permitted to build up for a substantial period of time and then the transistor is pulsed or interrogated for a brief period to provide an indication of whether the phototransistor has been illuminated during the time preceeding the interrogation. Even though there are few photons (and current carriers) in the base of the phototransistors, a sufficient current flow occurs during the brief interval of an interrogating pulse (e.g. 0.5 $\mu$s) to reduce the voltage at the collector and on output signal lead 88 by a readily measurable amount. Using a brief interrogating pulse, however, does not dissipate all current carriers from the base, and so it is necessary, before further readings are taken, to discharge the base by forward biasing the collector/emitter circuit for a sufficient period to permit all current carriers due to photons to be dissipated from the base. CPU 100 produces the interrogating pulse, and those pulses are conducted to appropriate NAND gates by decoder 98. Monostable multivibrator 96 is triggered by the CPU and produces a pulse of sufficient duration to dissipate all current carriers from the bases of the phototransistors. During persistence of the output of monostable multivibrator 96, the CPU is free to perform other functions.

Figure 9:
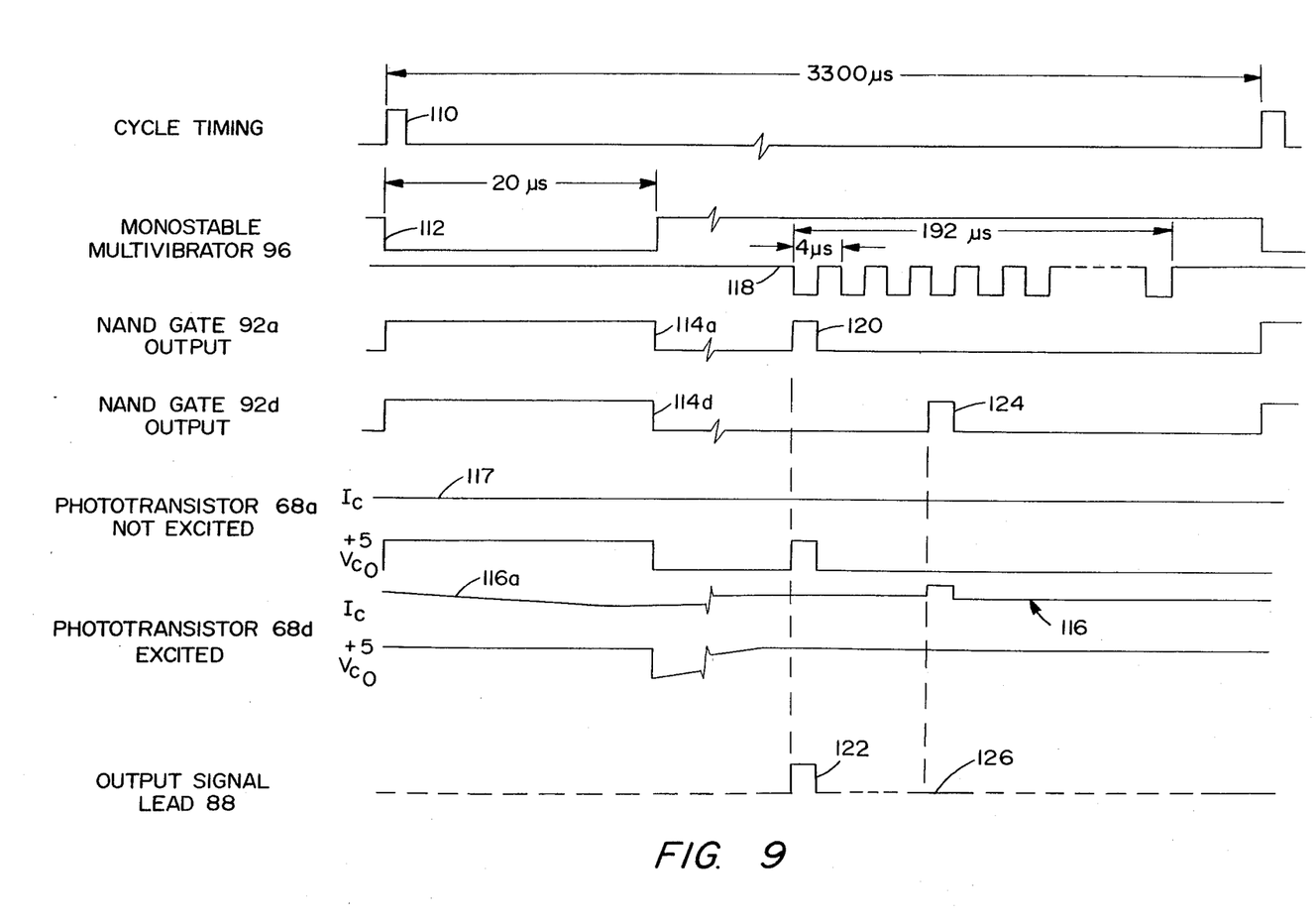
FIG. 9 is a timing diagram showing the condition at various circuit points in the circuit of FIG. 8.

Referring now to FIG. 9, a timing diagram representing operation of one system designed in accordance with the invention, there is a cycle timing pulse 110 which is produced by CPU 100 each time a cycle of operation is to be initiated, the term "cycle of operation" meaning that one dimensional measurement of an article traveling through hole 32 is to be made. In the specific embodiment under discussion, the period of each cycle is about 3,000 μs. Timer 98, under the control of CPU 100 and PROM 104 provides a cycle timing pulse 110 at that interval. The cycle timing pulse is applied to monostable multivibrator 96 which is arranged to time out after a period selected with reference to characteristics of phototransistors 68. The duration of the output pulse from the monostable multivibrator is established at about 20 μs in the specific embodiment under discussion. The multivibrator output is connected via circuit path 94 to one input of each of NAND gates 92 so that the outputs of the NAND gate produce simultaneous positive going pulses 114a and 114d that have a duration corresponding to that of monostable multivibrator output pulse 112. Output pulses 114a and 114d for respective NAND gates 92a and 92d are shown in FIG. 9; these exemplify the output of all NAND gates in the system. The consequence of application of pulses 114a and 114d to respective phototransistors 68a and 68d is that the collector/emitter circuit of each phototransistor is forward biased so that any current carriers in the base of the transistor will be dissipated. Thus, at the termination of pulses 114, all phototransistors 68 will, at least momentarily, be in a state corresponding to that in which no light input to the bases of the transistors is effective. By way of specific example, curve 116 represents the collector current in phototransistor 68d and it is assumed that such phototransistor has received light excitation to its base prior to generation of cycle pulse 110. Because phototransistor 68d is assumed to have received light excitation at its base there is finite current flow at the beginning of pulse 114d as seen at curve portion 116a. During subsistence of pulse 114d the collector current decreases as the current carriers are dissipated from the base of phototransistor 68d. Because the collector voltage is maintained at the maximum throughout the duration of pulse 114d and because light input to the phototransistor during the period is slight, current carriers present in the base in response to light input are dissipated and the collector current decreases as indicated at curve portion 116a. Pulse 114 has a sufficient duration (e.g. 20 μs) that all current carriers are dissipated and the collector current decreases to zero before termination of the pulse. After the current has been reduced to zero, multivibrator 96 times out and pulse 114d terminates in consequence of which all phototransistors 68 have been discharged and are ready to receive light input.

In contrast to phototransistor 68d, phototransistor 68a is assumed not to have been illuminated during the prior cycle of operation. Since the base of the latter phototransistor has received no photons, there are no current carriers in its base. Accordingly, no current flows during subsistence of pulse 114a, such condition being indicated by curve 117.

If an article resides within passage 36, light from certain LEDs 60 will be obstructed in consequence of which the corresponding phototransistors will not be excited. The phototransistors associated with positions where the article does not reside, however, will be excited by their associated LEDs. Those phototransistors 68 that are illuminated will accumulate current carriers in their bases and their respective collector voltages will decrease.

After elapse of a suitable interval following cycle pulse 110, the condition of each phototransistor will be representative of the history of light impingement thereon since occurrence of the cycle pulse. Interrogation of the phototransistors at this time provides an accurate indication of whether each phototransistor has been illuminated. Interrogation is initiated by application to each phototransistor in turn of a short interrogating pulse produced by CPU 100 and supplied via decoder 94 to an input of each NAND gate 92 in sequence. Such pulses are indicated by curve 118, a fictive composite of the inputs to all of the NAND gates. In actual circuit operation, each individual pulse shown in curve 118 is applied to a different NAND gate 92; curve 118 in FIG. 9 is employed to simplify and clarify the drawing. The individual pulses occur at a period of about 4.0 μs and each has a duration of approximately 0.5 μs.

Individual pulses in curve 118 are equal in number to the number of phototransistors in the system. In the specific embodiment shown in FIG. 1 there are 24 phototransistors arranged in the horizontal array and 24 phototransistors in the vertical array so that a total of 48 pulses are output through decoder 98 to forty-eight NAND gates 92. This requires about 192 μs, a time period during which the article experiences insignificant movement.

In the ensuing description, it will be assumed that an opaque article in passage 36 is in a position to obstruct light input to phototransistor 68a, so that the phototransistor is not excited, and in a position so that light input to phototransistor 68d is not interrupted whereby the latter phototransistor is excited. One of the pulses from timer 98 is connected to the right hand input on NAND gate 92a and the output of the NAND gate goes high as indicated at 120 in FIG. 9. Because phototransistor 68a has not been excited, the phototransistor presents a very high resistance so that the collector is at or near ground potential. Thus when pulse 120 is applied to the collector of photodiodes 68a, the pulse is effective in momentarily raising the potential of the collector to about five volts and an output pulse corresponding to the same is applied through diode 90a to signal line 88, such pulse being indicated at 122 in FIG. 9. Pulse 122 is treated by this system as a logical high.

Phototransistor 68d, in contrast to phototransistor 68a, is assumed not to have been obstructed by the article since the last cycle timing pulse 110. Accordingly, the base of phototransistor 68d has received photons which have been converted into current carriers so that the collector/emitter resistance is relatively low. Upon occurrence of a pulse from timer 98 to the input of NAND gate 92d, an interrogating pulse 124 is applied by the NAND gate to the collector of phototransistor 68d. The pulse has insignificant effect on the collector voltage, however, because the transistor has been rendered conductive by impingement of photons on its base. Accordingly, no signal occurs on output lead 88 as can be seen at curve portion 126 in FIG. 9; such phenomenon is treated by the system as a logical low and manifests absence of an article in alignment with the associated phototransistor.

The signals (logical highs and logical lows) produced on output lead 88 are stored in appropriate addresses within RAM 106 under the control of CPU 100 so that after an article has completed its traversal of opening 36, RAM 106 contains data representing the logic state for each of the forty-eight phototransistors for a plurality of locations along the article during its traversal of opening 36.

Figures 5, 6, 7A, 7B:
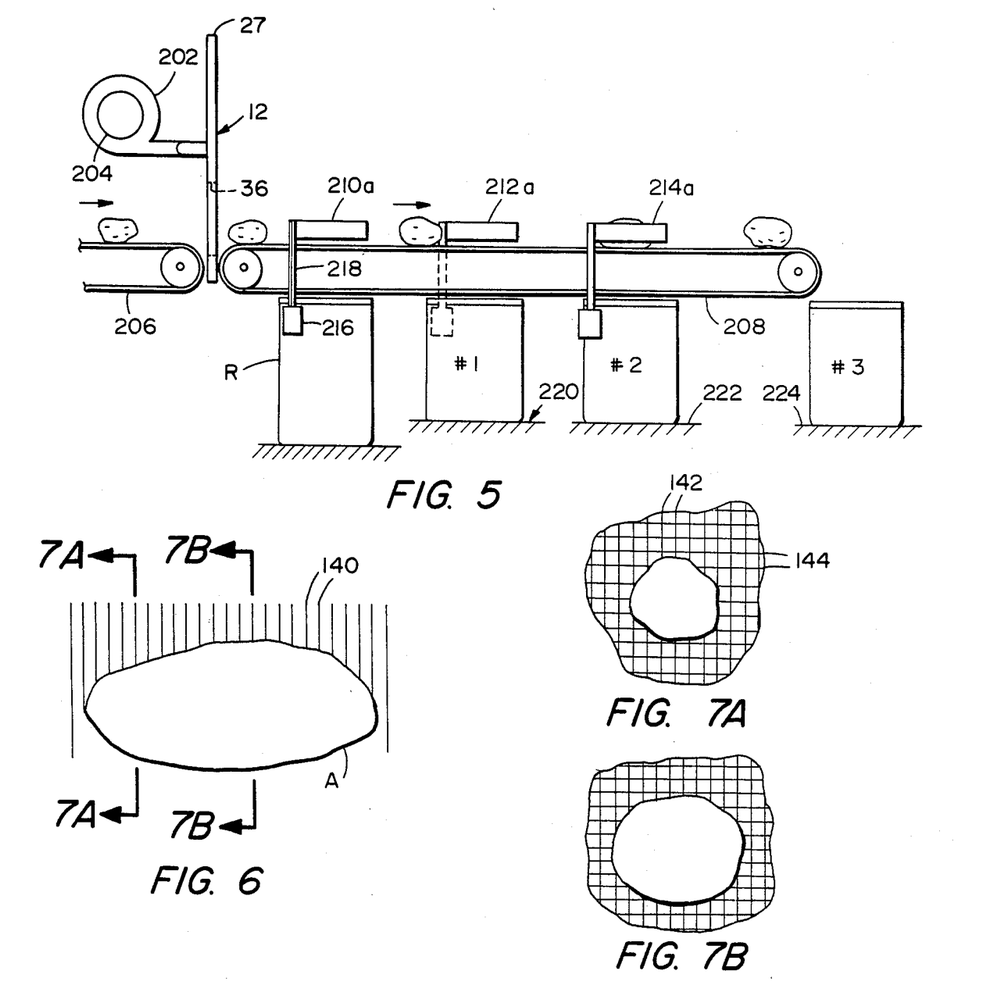
FIG. 5 is an elevation view of the filling machine of FIG. 4.
FIG. 6 is a view at enlarged scale of an article (e.g. a potato) moving through the sensor of the invention.
FIGS. 7A and 7B are cross-sections of the article of FIG. 6, the former being taken on line 7A—7A and the latter being taken on line 7B—7B of FIG. 6.

The operation of an article sensor embodying the invention will be explained in reference to a specific example wherein articles are conveyed through opening 36 at a velocity of about 380 feet per minute. At such velocity the article travels about 0.076 inches in one millisecond. Because cycle pulses 110 reccur about every 3.3 milliseconds, a measurement of the article can be made at intervals along the article of about ¼ inch. In FIG. 6, parallel vertical lines 140 represent the intervals along an article A. The horizontal interval between adjacent lines represents ¼ inch or a time period of about 3.3 milliseconds. All measurements for each interval along the article are made in the 192 microsecond period during which interrogating pulses 118 occur. At the rate of 380 feet per minute an article travels about 0.015 inches in 192 $\mu$s, an amount that can be ignored without introducing significant inaccuracies. More specifically, FIGS. 7A and 7B ignore the slight movement of the article during an interrogation period of 192 $\mu$s and it has been found that no significant errors arise from this. In FIGS. 7A and 7B parallel vertical lines 142 represent beams from individual LEDs 60 in bracket 55 to individual phototransistors 68 in bracket 63. Parallel horizontal lines 144 represent beams from individual LEDs in bracket 62 to individual phototransistors in bracket 70. In the specific embodiment of the invention here described, measurements are made at ¼ inch intervals in three mutually perpendicular directions.

After an interrogating cycle, during which 48 interrogating pulses cause RAM 106 to be loaded, there is substantial time (3,097 microseconds in the example depicted in FIG. 9) for CPU 100 to perform all computations concerning the cross-sectional area of the article at a given measuring plane. Since commercially available CPUs can easily operate at a rate of one megahertz (produced by clock-pulsed generator 102) adequate time exists for the information stored in RAM 106 to be processed.

Thus, after exit of the article from opening 36, RAM 106 contains all data necessary to compute the volume of the article and the weight of the article if the density of the article is known. Although a specific algorithm is not a critical part of the invention, an explanation of one specific algorithm that has been tested will afford a better understanding of the invention. The test concerned weighing of potatoes which were fed through opening 36 in single file at a velocity of about 380 feet per second. Each measurement, which occurred every ¼ inch during the traversal of a potato through the opening, produced a count of the phototransistors in the horizontal array that were obscured by the potato and a count of the phototransistors in the vertical array that were obscured. These two counts were multiplied and the product was added to a similarly derived product for every measurement of the article. Upon exit of the article, RAM 106 contained the sum of these products and that sum was multiplied by an empirically derived constant, about 121, to produce a number that closely corresponds to the weight of the potato. The specific algorithm is controlled by PROM 104, a replaceable element that can condition the system to compute virtually any characteristic of virtually any article. For example, the volume or shape of the article can be measured. If these characteristics are of interest, the user need only install an appropriately programmed PROM 104 to achieve virtually any function.

Accuracy and sensitivity of the article sensor are enhanced by minimizing the effect of ambient light and by assuring that each phototransistor 68 is excited by only a single LED 60. Referring to FIG. 3, in one system designed in accordance with the invention, bottom wall 42 has a width of ½ inch so that slits 46 have a length of ½ inch. Slits 46 have a width of approximately one millimeter and thus tend to collimate the light produced by LEDs 60 to reduce spreading or diffusion of the light. On the side of opening 36 opposite from bottom wall 42, top wall 44 is formed with slits 48 which also have a width of about one millimeter. Each slit 48 is longitudinally aligned across opening 36 with an individual slit 46. By the time light from the LEDs reaches top wall 44, it has spread or diffused to some degree, indicated by arrow D in FIG. 3, and the narrowness of slits 48 eliminates adverse effects of such diffusion. Further reduction in diffusion is afforded by the presence of cavity 54 which in the specific design referred to above has a length in the direction of light travel of about one inch. Thus adverse effects of any further diffusion, such as indicated at arrow D', are eliminated, because slits 52 in rear wall 50 also contribute to collimation of the light originating from an LED 60. Furthermore, slits 52 are about one millimeter wide and are in alignment with slits 48 and 46. Accordingly, light reaching each phototransistor 68 is composed substantially exclusively of light from a single LED 60. Because ambient light does not pass through slits 46, it is widely diffused when it strikes the surface of top wall 44 that bounds opening 36; this fact and the collimating effects afforded by slits 48 and 52 virtually totally exclude ambient light from impingement on phototransistor 68.

Figure 4:
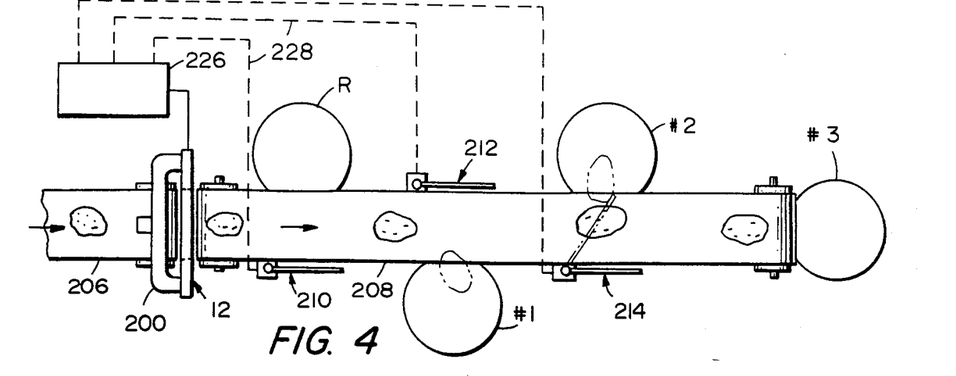
FIG. 4 is a plan view of a container filling machine that employs the sensor of FIGS. 1-3.

A sensor according to the invention can be incorporated into container filling apparatus with advantage. In FIGS. 4 and 5, sensor 12 is seen to be oriented in a vertical position transverse to the line of product travel. Communicating with air inlet ports 29 (see FIG. 1) is a manifold 200 to which air is delivered by a centifigul fan 202, the inlet of which has a filter 24 so that the air drawn into the interior of housing 12 is substantially free of particulate matter. At the upstream end of the housing is an inlet conveyor 206, the upper run of which is alignment with opening 36 so that as the articles exit the inlet conveyor they are propelled or transported through the opening. Downstream of the sensor is an outlet conveyor 208 which receives the articles upon their exit from opening 36. By the time an article reaches outlet conveyor 208 the desired characteristics of the article have been computed by the circuitry described hereinabove.

Positioned adjacent outlet conveyor 208 are three article diverting mechanisms 210, 212, 214. Each of the mechanisms includes a rotary solenoid coil 216 which causes an operating shaft 218 to rotate in response to energization of the solenoid coil. Fastened to the operating shaft of each diverting assembly is a diverting blade, the blades being identified by reference characters 210a, 212a, and 214a respectively. Included within each solenoid 216 is a biasing spring (not shown) which positions the diverter blades at the position shown in solid lines in FIG. 4, a position at which the blade is clear of the conveyance path of outlet conveyor 208. When a given solenoid is energized, the blades pivot to the broken line position shown in FIG. 4 so as to divert an article from conveyor 208.

In association with diverting mechanism 210 is a container R into which articles greater or less than a prescribed range are deposited in response to activation of diverter mechanism 210. Downstream of container R on the opposite side of coneyor 208 in association with diverting mechanism 212 is a support schematically indicated at 220 for a container identified as #1. Container #1 can be an imprinted plastic bag, for example, one which bears trademark and product descriptive information as well as a weight. Such containers are seen in retail food markets, a five pound bag of potatoes being typical.

Downstream of container support 220 on the opposite side of coneyor 208 is a second container support 222 on which a container #2 is supported, container #2 being of the type described hereinabove with respect to container #1. Container support 222 and container #2 are positioned so as to receive articles diverted from conveyor 208 by diverter mechanism 214. Downstream of support 222 and in longitudinal alignment with the discharge end of conveyor 208 is a container support 224 on which a container identified as #3 is supported, the latter container being identical to containers #1 and #2. Container support 224 and container #3 are positioned so as to receive articles not diverted by diverter mechanisms 210, 212 and 214.

For activating the solenoids in diverting mechanism 210, 212, 214 in accordance with the characteristics of each article sensed by sensor 12 there is a solenoid control circuit 226 which is driven by commands from CPU 100 to energize selected solenoids at desired times, individual control circits indicated at 228 extending from controller 226 to each of the solenoids.

In operation, an article arriving at outlet conveyor 208, the characteristics which have been determined by traversal of opening 36 in sensor 12, is diverted if its weight or other characteristic is greater or less than some prescribed range. For example, in the case of potatoes, extremely large potatoes and extremely small potatoes are sold in different markets than average size potatoes. If an article is not rejected by diverter mechanism 210, it continues on outlet conveyor 208 to diverting mechanism 212. At the begining of operation of the system the article is diverted by diverting mechanism 212 to container #1, because microprocessor 100 causes control circuit 226 to energize the solenoid in diverting mechanism 212 at an appropriate time. In connection with the foregoing, CPU 100 stores in RAM 106 data that represents the weight of the article diverted into container #1 as well as data that identifies the container into which the article was diverted. Thus, the RAM has stored at all times data that represents the cumulative weight deposited in each of the containers #1, #2, and #3.

Deposit of articles in container #1 continues until that container reaches a state at which it is almost full. By way of example, in the case where the containers are five pound potato bags, filling of container #1 will continue until the weight of potatoes in the container reaches a weight less than five pounds, for example 4.6 pounds. At this time, microprocessor 100 will act to avoid operation of diverting mechanism 212 until an article having a weight which will bring the total weight in container #1 to the prescribed amount (five pounds) plus some tolerance increment, such as 0.1 pounds. In this example, any article that is less than 0.4 pounds and greater than 0.5 pounds will not be diverted into container #1 by diverting mechanism 212. Such articles, instead, are diverted into container #2 by diverting mechanism 214 in response to an appropriate signal from CPU 100 and controller 226. As this occurs the aggregate weight of articles deposited into container #2 will be accumulated in RAM 106. When an article having the desired weight to complete filling of container #1 is sensed, the article will be diverted into container #1 and a suitable signal will be produced which informs the operator that container #1 has been filled and can be removed and replaced by an empty container.

The foregoing procedure is repeated with containers #2 and #3. When container #2 reaches some prescribed level below the capacity thereof, diverter mechanism 214 is deenergized to permit succeeding articles to move over the end of conveyor 208 into container #3. This continues until an article having the prescribed weight for completing the filling of container #2 is sensed. Such article will be diverted by diverting mechanism 214 to container #2 and a signal will be produced to inform the operator to remove the full container and replace it with an empty one.

The above described procedure is again repeated with respect to containers #3 and now empty #1. When container #3 reaches a weight near the capacity but less than the capacity, subsequent articles will be diverted to container #1 until an article of precisely the correct weight to complete the filling of container #3 is permitted by diverter mechanism 212 to pass to the end of the conveyor. The foregoing procedure is repeated at a high rate and each container is filled with a weight at least that specified on the container but not gratly in excess of the specified weight so that compliance with fair labeling regulations is achieved without the economically wasteful procedure of grossly overfilling any container.

Figure 10:
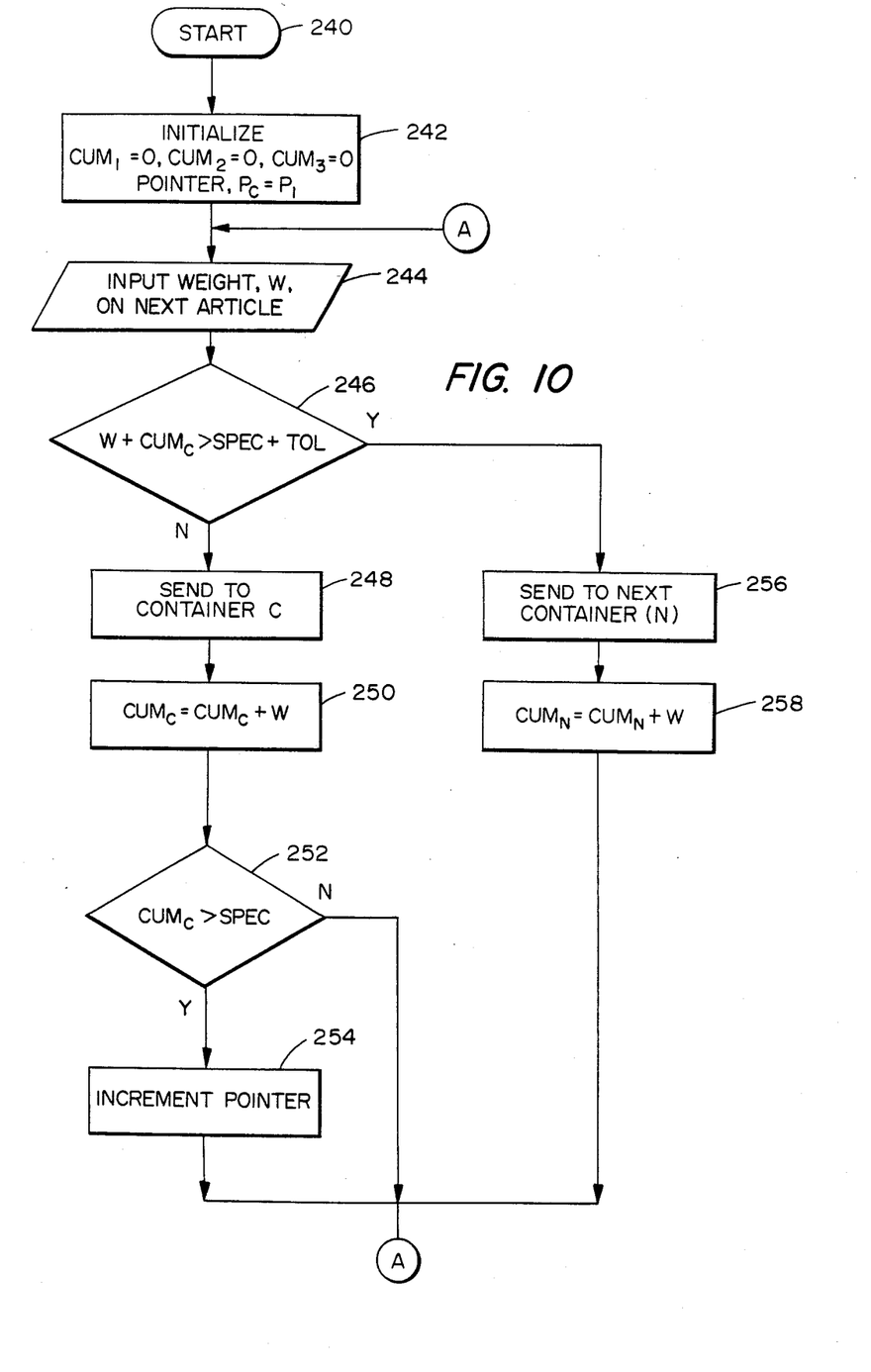
FIG. 10 is a simplified flow chart that represents the operation of the container filling machine of FIGS. 4 and 5 in an exemplary operation.

The foregoing operation will be summarized by reference to the flow chart of FIG. 10. At start up, designated by symbol 240 in FIG. 10, CPU 100 is caused to initialize the system; more specifically the addresses within RAM 106 where the cumulative weight for each of the three containers is stored are set to zero. This is represented in block 242 by setting to zero the addresses within RAM 106 which are identified as $CUM_1$ for the cumulative weight in container #1, $CUM_2$ for the cumulative weight in container #2, and $CUM_3$ for the cumulative weight in container #3. Additionally, a pointer $P_C$ is set to the value $P_1$ which indicates that the next article will be diverted to container #1. As system operation proceeds the weight of each article transported throught opening 36 from inlet conveyor 206 to outlet conveyor 208 is measured as indicated in block 244, the weight being indicated by the variable W. CPU 100 then adds the weight W to the weight of the current container being filled and tests whether that sum is greater than the specified weight, five pounds in the example under discussion plus a tolerance, 0.1 pounds. If the specified weight in the container identified by $P_C = P_1$ would not be exceeded by the newly entering article, diverting mechanism 212 is activated as represented by block 248 and the new cumulative weight for the current container is computed as represented by block 250. The new cumulative weight is then compared with the specified weight at block 252 and if the new cumulative weight does not exceed the specified weight, control is returned through connector A to repeat the calculations with the next article. If, on the other hand, the test at block 252 indicates that the contents of the current container is greater than the specified weight, pointer $P_C$ is incremented, as indicated at block 254, so that subsequent articles will be diverted to the next container. After the pointer is incremented, system control is returned to receive the next article.

If the test performed by block 246 indicates that the current article is too large and would overfill the current container, a signal is produced to activate the next diverting mechanism, such as 214, so as to send the overweight articles to the next container. This action is indicated at block 256. The weight in the next container is accumulated in an appropriate address in RAM 106, indicated at block 258, and system control is then returned to process the next article. Because of the high speed achieveable with commercially available microprocessors, the foregoing operations can be performed with sufficient rapidity that the decision as to which container an article should be placed in is made virtually immediately after the article exits opening 36.

Although the specific embodiment the invention described to this point is highly satisfactory for current practices in packaging fresh fruits and vegetables, accuracy can be enhanced if needed for other articles or to accomodate such marketing conditions as might exist in the future. As is clear from FIGS. 7A and 7B, the sensing of the article shape at each interval during article traversal produces measurements equivalent to those that would be produced if the article had precisely rectangular cross-sectional shape. These inaccuracies can be satisfactorily compensated for by an appropriate algorithm, but a more precise measurement can be achieved by providing an additional pair of orthogonal arrays immediately upstream or downstream of the previously described arrays.

Figures 11, 12:
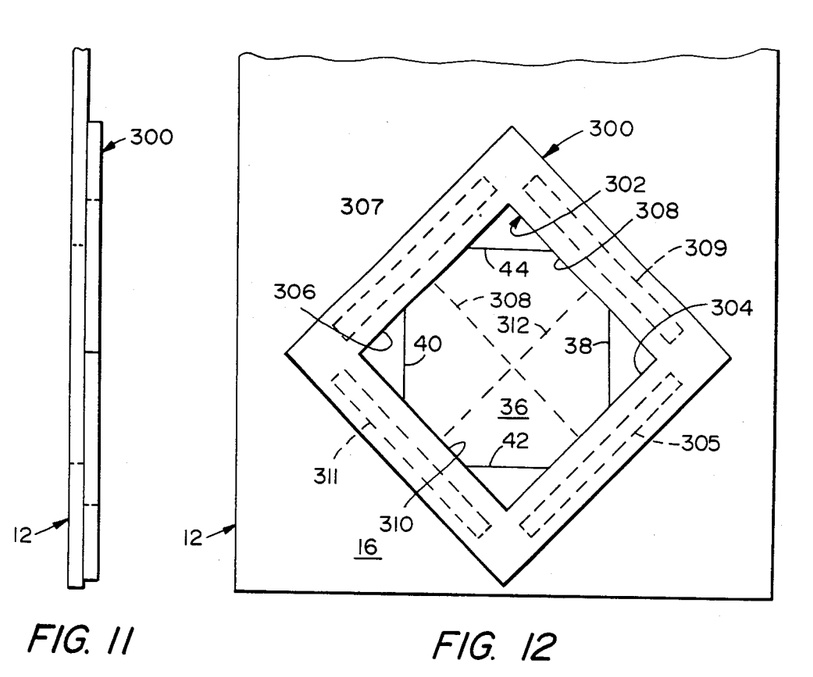
FIG. 11 is a side view of a modification of a sensor of the invention.
FIG. 12 is a rear view of the modified sensor of FIG. 11.

Referring to FIGS. 11 and 12, an auxiliary housing 300 is secured to the exterior surface of plate 16 of housing 12. The auxiliary housing is of generally rectangular shape and defines a rectangular or square opening 302 in the center thereof. Auxiliary housing 300 is mounted so that its opening 302 aligns with opening 36 in housing 12. The walls that define opening 302 lie obliquely of the walls that define opening 36, preferably residing at an angle of 45°. The internal construction of housing 40 is similar to that described previously in connections with FIGS. 1-3 in that opposite sides of the auxiliary housing contain LEDs and phototransistors constructed and arranged as described previously. More specifically, auxiliary housing 300 includes a side 304 which can contain a linear array 305 of LEDs and a confronting side 306 which can contain a linear array 307 of phototransistors. A dashed line 308 represents the light path from one LED in side 304 to one phototransistor in side 306. Similarly, auxilary housing 300 has a side 308 in which is installed a linear array 309 of LEDs and a confronting side 310 which includes a corresponding linear array 311 of phototransistors. A dashed line 312 represents a light path from one of the LEDs in side 308 to one of the phototransistors in side 310. Light paths 308 and 312 are mutually perpendicular and lie at a 45° angle with respect to the light paths produced in housing 12 as described previously. There are connections (not shown) to the circuitry on board 80 so that measurements of the article as described previously can be taken at the oblique position. Thus, the addition of auxiliary housing 300 provides for additional data input to the computing system and provides enhanced accuracy in measuring the shape of an article at it traverses openings 36 and 302 of the sensing device of the invention.

Figure 2:
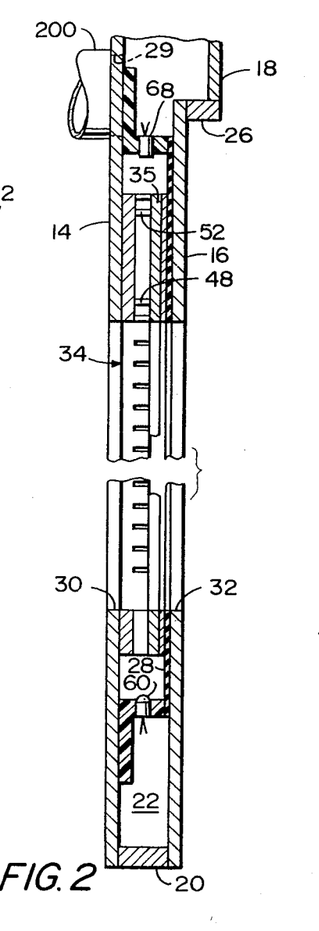
FIG. 2 is a fragmentary sectional view at enlarged scale taken along line 2—2 of FIG. 1.
Figure 13:
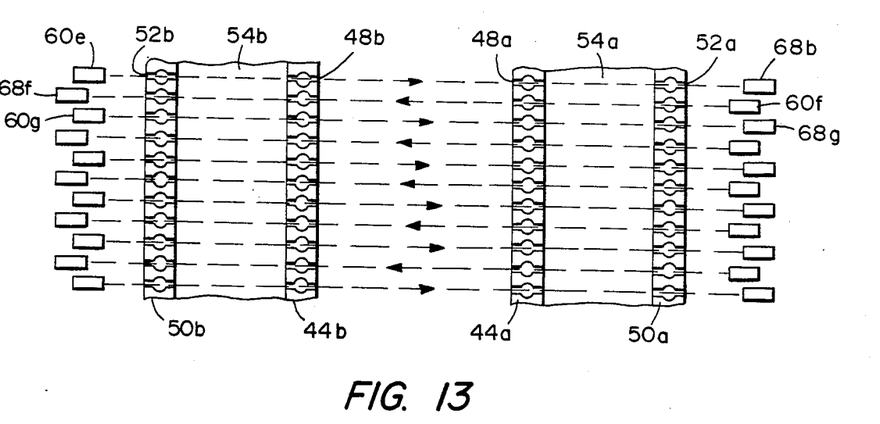
FIG. 13 is a view similar to FIG. 3 and shows a modification.

Further accuracy can be achieved by spacing the phototransistors and LEDs closer to one another. In the embodiment described previously in connection with FIGS. 1-3, the LEDs and photocells are spaced on one quarter inch centers. In the modification shown in FIG. 13, the LEDs and phototransistors are mounted on one eighth inch centers. In FIG. 13 reference numerals corresponding with those employed in FIGS. 1-3 are employed, such numerals in FIG. 13 having appropriate lower case letters appended thereto. A side wall 44a in which is formed a plurality of slits 48a is provided at one side of the opening through which articles travel. Slits 48a are formed on one eighth inch centers. An inner wall 50a is formed with a plurality of slits 52a which are equal in number and spacing to slits 48a and are in alignment therewith. A cavity 54a separates outer wall 44a and inner wall 50a and serves to reduce the adverse effects of beam dispersion and reflection. Confronting wall 44a across the opening through which articles travel is a second wall 44b which defines a plurality of slits 48b. Slits 48b are equal in number and spacing and in alignment with slits 48a. Inward of wall 44b is an inner wall 50b in which is formed a plurality of slits 52b which are equal in number and spacing and in alignment with slits 48b in the outer wall. Outer wall 44b and inner wall 50b are separated by a cavity 54b which functions as described previously in connection with cavities 54 and 54a.

There is a LED 60e inward of inner wall 50b; the LED is mounted by suitable means (not shown) to direct a beam of light through an aligned set of slits in wall 50b, 44b, 44a, and 50a. Inward of inner wall 50a is a phototransistor 68a supported to receive and respond to light from LED 60e. Supported adjacent to phototransistor 68e is a LED 60f which is mounted to produce a beam that passes through a set of aligned slits to coact with phototransistor 68f. Adjacent to phototransistor 68f is a LED 60g which is mounted with respect to a set of slits in the inner and outer walls to coact with a phototransistor 68g which is adjacent to LED 60f. As can be seen in FIG. 15 the pattern described above continues and in the specific embodiment here under discussion, there are a total of 48 LED/phototransistor pairs that produce a corresponding number of beams that span the opening through which the articles pass. Consequently, the accuracy of measurement is improved because dimensional variation in the article of one eighth inch can be detected. It should be noted that the LEDs and phototransistors of the modification of FIG. 13 are physically smaller so that they can be mounted on one eighth inch centers; components having such size are readily commercially available.

A sensor in accordance with the present invention is highly versatile in that the form of output of the sensor is governed primarily by the program contained in PROM 104, a replaceable element. For example, the straightness of a food article can be determined, an important factor in packaging whole dill pickles that must be straight so that a proper number can be packed in a jar. In testing articles for straightness, the number and identity of phototransistors that are obscured during traversal of such an article through the sensor can be employed to determine whether the articles are substantially straight or are "C-shaped". The leading portion of a "C-shaped" article will obscure a first contiguous group of phototransistors, the center portion will obscure a second contiguous group of phototransistors which is laterally spaced from the first group, and the trailing portion will obscure a third group of phototransistors at or near the first group; on sensing these phenomena, CPU 100 will cause rejection of the "C-shaped" article. Additionally, uniformity of diameter can be sensed because a condition wherein fewer phototransistors are obscured at one end of the article than are obscured at the other end of the article indicates that the article is tapered and therefore unsatisfactory.

Thus it will be seen that the present invention provides a sensor by which individual articles can be measured to produce an output corresponding to the weight, shape, or size of an article. Because the measurement can be made virtually instantaneously, diverting equipment at the outlet of the sensor can be activated in time to effect sorting or other classification of the articles. Moreover, because a number representing a characteristic of the article is produced in binary form, that number can be quickly operated upon or combined with other numbers so that virtually any characteristic of one article or a plurality of articles can be readily ascertained. A sensor in accordance with one aspect of the invention can operate in virtually any environment, because error producing results of dust and the like are virtually eliminated and because response to ambient light is virtually nonexistent. Because the sensor employs highly reliable semiconductor elements, it has a long operating life and requires virtually no maintanence.

Although several embodiments of the invention have been shown and described, it will be obvious that other adaptations and modifications can be made without departing from the true spirit and scope of the invention.

What is claimed is:

1. A circuit for rapidly interrogating a plurality of phototransistors that are randomly subject to illumination to determine which phototransistors have been illuminated, the phototransistors each having an emitter, a collector and a base and being constructed and arranged so that impingement of photons at the base reduces resistance to current flow between the collector and emitter in proportion to the number of photons impinging on the base, the circuit comprising a power source, means for coupling said power source to the collectors of respective said phototransistors, said coupling means including a dropping resistor in series with said power source and said collector so that the voltage level at said collector is a function of the number of photons impinging on said base, a plurality of gating means corresponding in number to the number of phototransistors, there being an individual gating means associated with each individual phototransistor, each said gating means having an output coupled to said collector of the phototransistor with which the gating means is associated, said output having a normal voltage level that is substantially equal to the voltage level on said emitter so as to permit accumulation in said base of current carriers arising from photon impingement thereon, means for supplying an interrogating voltage pulse to each said gating means in sequence so as to vary said normal voltage level and cause current flow between said collector and emitter in proportion to the number of photons having impinged on the base, the duration of the interrogating voltage pulse being insufficient to fully discharge the photons from the base, means for measuring the collector voltage of each phototransistors in synchronism with application of said interrogating voltage pulse to an associated gating means, and means active after all said phototransistors have been interrogated with an interrogating voltage source for causing all said gating means simultaneously to supply to respective collectors a discharging voltage pulse, said discharging voltage pulse having a duration sufficiently longer than said interrogating pulse to discharge substantially completely the photons in said bases.

2. A circuit according to claim 1 wherein said discharging pulse has a duration greater by at least one order of magnitude than the duration of said interrogating pulses.

3. A circuit according to claim 1 including means for establishing a time interval between said discharging voltage pulse and said interrogating pulses that has a duration greater by at least one order of magnitude than the duration of said discharging pulse and of said interrogating pulse, thereby enhancing the gain of said circuit.

4. A circuit according to claim 1 wherein said discharging voltage pulse causing means comprises a monostable multivibrator having an output coupled in common to every said gating means.

5. A circuit according to claim 1 wherein each said gating means has a first input and a second input, a monostable multivibrator having an output connected in common to all said first inputs and producing a pulse corresponding to said discharging voltage pulse, a decoding circuit having a plurality of outputs connected to respective second inputs, said decoding circuit producing a sequence of interrogating pulses to respective said outputs so as to cause said gates to interrogate said phototransistors in sequence.

* * * * *